United States Patent
Stiller et al.

(10) Patent No.: US 7,753,969 B2
(45) Date of Patent: Jul. 13, 2010

(54) METHOD OF CONVERTING ANIMAL WASTE INTO A MULTI-PHASE FUEL

(75) Inventors: Alfred Herman Stiller, Morgantown, WV (US); Laura Shannon Eddy, Bruceton Mills, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 12/217,194

(22) Filed: Jul. 2, 2008

(65) Prior Publication Data

US 2008/0271363 A1  Nov. 6, 2008

Related U.S. Application Data

(62) Division of application No. 11/393,342, filed on Mar. 30, 2006, now abandoned.

(51) Int. Cl.
*C10L 1/00* (2006.01)
(52) U.S. Cl. ............... 44/307; 44/281; 208/400; 554/8; 554/23
(58) Field of Classification Search ........... 44/281–282, 44/307, 311, 313; 208/412–423, 400; 554/8, 554/23
See application file for complete search history.

(56) References Cited

U.S. PATENT DOCUMENTS 4,298,450 A * 11/1981 Ross et al. ............... 208/419
4,731,491 A * 3/1988 Urban et al. ............. 568/761
4,824,558 A * 4/1989 Maa et al. ................ 208/420
4,935,567 A * 6/1990 Yokoyama et al. ....... 585/240

OTHER PUBLICATIONS

Stiller, A.H. e al. (1996). Fuel Processing Technology, 49, 167-175.*
Yin, S. et al. (2010). Bioresource Technology, 101, 3657-3664.*

* cited by examiner

*Primary Examiner*—Robert J Hill, Jr.
*Assistant Examiner*—Brian McCaig
(74) *Attorney, Agent, or Firm*—William Aylor

(57) ABSTRACT

A method of creating a multi-phase fuel wherein said fuel comprises a gas, a solid, a liquid solvent phase and an aqueous phase from animal waste comprising the combination of the animal waste, a solvent, and a water/alcohol solution into a fluid mixture, placing the mixture into a closed reactor, heating said reactor between about 245° C. and 385° C. for between about 5 and 70 minutes and cooling said resulting multi-phase fuel. The animal waste may be manure, mortalities, municipal waste, or chicken litter. The preferred solvent is petroleum with the preferred petroleum being diesel fuel. The final multi-phase fuel can be separated into four separate fuels: a solid fuel, an emulsified solid in the liquid solvent phase by blending the solid, the solvent and a surfactant, an aqueous phase, and the recovered liquid solvent phase. Petroleum is the preferred solvent and the separation may be any conventional means. The mixture preferably consists of 1 part by weight animal waste, about 1.5 parts by weight diesel and between about 0.11 to about 1.86 parts by weight a water/alcohol solution. The water/alcohol solution is between about 5% to about 85% alcohol before heating. Additionally, an alkali base may be added to increase waste solubility.

10 Claims, No Drawings

METHOD OF CONVERTING ANIMAL WASTE INTO A MULTI-PHASE FUEL

CROSS-REFERENCE TO RELATED APPLICATIONS

This is a divisional application of Ser. No. 11/393,342 filed Mar. 30, 2006, now abandoned.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to improved methods for the conversion of animal waste to multiple fuels and, more specifically, it relates to such conversion processes in which the associated fuels are both solid phase, multiple liquid phases and a gas phase which can be released.

Energy needs and the desire to protect the environment have resulted in efforts provide alternative sources of fuel. To date, in addition to the conventional fossil fuel sources and the use of nuclear energy, numerous alternative energy sources have been utilized such as the wind, or mechanical or thermal use of large bodies of water. Also, with respect to environmental considerations, low sulfur coal and methods for cleaning the exhaust from the use of fossil fuels have been utilized.

The U.S. Department of Energy is faced with the immense task of balancing the energy demand of our society with the environmental consequences of generating that energy. The primary focus has been on the efficiency of conversion of fuel to a useful form of energy. Energy can simply be defined as the ability to do work. The energy value of a fuel normally is measured by temperature change. Fundamentally fuels are valued by their ability to supply heat. In the traditional sense, combustion processes produce heat from the fuel. As fuel is oxidized, heat is released. The heat is converted through some mechanical means to a more useful form of energy for application. As the efficiency of the conversion increases, the negative impact on the environment decreases.

It has been suggested to convert agricultural and biological waste such as sawdust and various manures to liquid fuels and subsequently to energy (see Stiller et al., Fuel Processing Technology 49, 167, 1996 and Dadyburjor et al., Paper presented at 209.sup.th National Meeting, American Chemical Society, Anaheim, Calif., April, 1995). The initial project investigated the effects of recycling "waste" materials by using them as co-liquefaction agents for the conversion of coal to liquid fuels. See, for example, the use of shredded tires (see Sharma et al., Energy and Fuels 12, 589, 1998), plastic materials such as polyvinyl chloride, (see Zondlo, J. W., Paper presented at 214.sup.th National Meeting, American Chemical Society, Las Vegas, Nev., September, 1997) and high density polyethylene, (see Dadyburjor, D. B., Paper presented at the Tri-State Catalysis Society Spring Symposium, Charleston, W.Va., April, 1998), as well as ag- and bio-wastes.

In an effort to improve the coal liquefaction process, it was hypothesized that organics with conjugated double bonds, which are plentiful in manures and other agricultural wastes, would catalyze coal liquefaction reactions. In testing the hypothesis, it was found that the wastes did not improve the conversion of coal to liquid fuel, but the organic matter of the wastes were converted completely to fuel.

Coal is not a necessary prerequisite for fuel production from manures. Stiller et al., Co-processing of Agricultural and Biomass Waste with Coal, Fuel Processing Technology, In Press, 1996 indicates that one can produce fuel with good yields using the manure alone, along with an iron-based catalyst.

The present invention focuses on the use of waste, such as animal manure, as a source of material from which to produce liquid fuel (see, Stiller et al., Fuel Processing Technology 49, 167, 1996). The present invention improves upon previous inventions within the field, including United States Patent Application Number 20030221361, by introducing a method to reduce an ash by-product of the reaction, making the heating of the reaction more uniform, increasing the solubility of the waste, and the using of all solid and liquid by-products as a fuel.

BRIEF SUMMARY OF THE INVENTION

The present invention provides a method of making fuel from waste which may be animal manure, chicken litter, municipal waste, or animal mortalities. It involves mixing the waste with a predetermined quantity of a solvent, preferably diesel fuel, and a water/alcohol solution until the reactants are fluid. The mixture is then heated in a closed reactor for a sufficient time, a sufficient pressure and a sufficient pressure to create a fuel comprised of various phases followed by either active or passive cooling of the multi-phase fuel. After the reaction, the multi-phase fuel comprises a solid phase fuel, two liquid phase fuels; a liquid solvent phase fuel, and an aqueous phase fuel, and a gas phase which may be released after cooling.

The present invention improves upon the previous work in the field by adding both a water/alcohol solution and solvent to the waste before the reaction. The addition of alcohol to the water increases the solubility of the waste in the solvent. The addition of a solvent to the mixture makes the material more fluid and thus easier to handle. In addition, using diesel fuel as the solvent provides for more uniform heating of the mixture in the reactor. The diesel fuel may also be reused in subsequent reactions. The reused diesel fuel has increased the amount of soluble fraction in subsequent reactions without limiting the solubility of the ash in the water/alcohol solution.

Ash, which may be employed as a fertilizer, may be a byproduct of the process. However, the ash is not desirable for a fuel product. The ash reduces efficiency of the fuel. The previous inventions all contained ash as a byproduct of the creation of fuel from waste. However, the present invention has reduced the ash by the addition of a solvent to the mixture before the reaction resulting in an ash that is dispersed in the aqueous phase or dissolved in the aqueous phase. Preferably, no ash is present in the solid product or the liquid solvent phase of the mixture after the reaction as all ash will be within the aqueous phase and it is preferred to be dissolved within the aqueous phase.

The object of the present invention is to provide a method for the conversion of animal waste into usable fuel products. The present invention discloses a method to create four different fuels. A dried solid fuel, emulsified solids within the liquid solvent phase, dissolved waste in the liquid solvent phase enhanced by the addition of a water/alcohol solution, and an aqueous phase resulting from the water/alcohol solution. The aqueous phase has never been used as a potential fuel in previous inventions.

It is a further object of the present invention to provide such a system which may employ either animal manure, chicken litter, municipal waste, or animal mortalities as the animal waste.

It is a further object of the present invention to provide such a system which may economically be exploited on a farm, thereby eliminating the need to transport the agricultural waste great distances to a processing facility.

It is a further object of the present invention to provide such a fuel while minimizing otherwise present environmental hazards and eliminating undesirable manure odors.

It is a further object of the present invention to provide such a system for creating fuels from animal manure that will greatly enhance the energy value of the original manure.

It is a further object of the present invention to provide such a system which will facilitate production of fuel on a farm which may be used for farm purposes. These purposes include the generation of electricity, or alternatively, the fuel may be transported to a central refinery unit for conversion into petroleum-like fuels.

It is another object of the present invention to provide three different fuels, an aqueous phase, a liquid solvent phase, and a solid fuel that can be separately utilized.

It is still another object of the present invention to improve the efficiency of previous attempts to convert animal waste to fuel and produce a product with reduced ash byproduct in the fuel.

It is yet another object of the present invention to provide such a system that utilizes the ash byproduct as a fertilizer.

DETAILED DESCRIPTION OF THE INVENTION

The present invention converts animal waste in the form of animal manure, chicken litter, animal mortalities, and municipal waste into fuels in a more efficient manner with reduced ash byproduct.

Manure is a byproduct of hog production that is both an asset and a liability. The asset is its value as a fertilizer. The liabilities are the odor and the water pollution problems. Converting the manure into fuel will eliminate the liabilities. The fertilizer value will be retained in the residue and vapors of the conversion process. In concentrated production facilities, disposal will be eliminated. The surplus fuel and fertilizer produced can be marketed profitably.

The poultry industry generates huge quantities of litter annually. The poultry floor is covered with sawdust, wood shavings or rice hulls and is mixed with poultry manure, mortalities and feathers by the time the litter is removed from the coup. Poultry litter is a mixture of poultry waste, wood shavings, sawdust, rice hulls, waste feed, feathers, and other wastes that have fallen to the floor of a poultry operation. The present invention can eliminate this litter in a manner to produce a fuel for the user. Currently, some of the poultry litter is used as a fertilizer, and another portion is used as a constituent of feed provided to beef cows. However, there may not be enough farm land area in the region to use all the litter as fertilizer. Alternative methods of disposal of agricultural wastes are needed. The present invention uses chicken litter and other agricultural wastes as feedstock for liquefaction. Historically, liquefaction is a process that has been used to convert coal to liquid fuels. Poultry producers would carefully harvest litter for the conversion process. Therefore, storage of litter and the associated loss of litter in runoff would be minimized. Furthermore, legislation is likely to be introduced that could outlaw the use of poultry litter as a feed. Accordingly, improperly managed litter and excess litter could find itself in the waters. Improper management of the litter pollutes the waters with disease-causing bacteria and nutrients which could severely strain water-treatment facilities. The current strategy used to solve this problem is to spread the litter over a wider area. The net effect is that the problem is not solved, but only diluted.

The scope of the problem is well defined. It is imperative to manage the poultry litter in a non-polluting fashion. A paradigm shift will be necessary to achieve this. The present invention will not only meet these two requirements, but will also generate energy from the poultry litter. Depending on the relative economics of capital equipment purchases and transport costs for poultry litter, the energy could be generated either at a central station or decentralized to each poultry farm.

Although poultry litter has value as fertilizer, poultry producers do not own enough land to use all the litter as fertilizer in an environmentally safe manner. Disposal of all litter as fertilizer would require uniform and judicious application to all the land that is tilled and used for pastures in the region (National Agricultural Statistics Service, 1997). As a result, the total amount of poultry litter and wastes from other animals exceeds the amount that can be used as fertilizer.

While other manures can be used as substrates, hog manure is among the preferred for the present invention for the following reasons. Manure from the hog industry is, for the most part, harvestable. Being harvestable is critical for the conversion to fuel, but makes the manure a liability in spite of its value as fertilizer. Storing the manure at a central location and occasional spreading on fields generates odor problems that our society is not willing to tolerate. Thus the hog industry generates manure as a byproduct that desperately needs an alternative use. There are many hog production units, generating adequate quantities of manure to make it cost effective to convert the manure to fuel. Most of these production units also have a use for the fuel, produced, thereby eliminating the need to develop a new marketing system for the fuel to make the process work.

While useful, it is more difficult to establish the technology in the cattle industries. Cattle produce much more manure than hogs, but only a small fraction of it is harvestable. Most of the manure that is harvestable is from cattle that are fed purchased feed, resulting in reduced need on-site for the fuel produced. There would, therefore, be greater need for fuel produced by the present invention to be sold. For the fuel to be of any value, it must be sold. Hence, for the cattle industry, the initial fuel marketing is much more important for this process to be of value than it is for the pork industry. With regard to poultry manure, although most is harvestable, it has some of the same drawbacks as cattle manure. Poultry manure also has value as cattle feed.

Animal mortalities are common on a farm. The mortalities must be disposed of quickly and properly to prevent disease within the rest of the animals. The invention can eliminate the animal mortality in a manner to produce a fuel for the user.

Municipal waste continues to be a problem in all areas of the world. The present invention can be used to dispose of municipal wastes in a manner that produces a fuel product.

In the present invention, agricultural waste and, preferably, animal manure is efficiently converted to numerous phase fuels with usable byproducts. In the present invention, the waste is mixed with a solvent which is preferably diesel fuel and a water/alcohol solution until the mixture is fluid and the mixture is then heated in a closed reactor. Then the mixture forms three distinct usable fuels after the reaction: an aqueous phase fuel, a liquid solvent phase fuel, and a solid fuel.

The reaction conditions of the present invention employed to convert the manures to fuel are less rigorous and less expensive than the conditions necessary for liquefaction of coal. The only reactants required are the wastes, the solvent fuel, and the water/alcohol solution.

The present invention provides technology capable of generating liquid-fuel products, and hence energy, from waste, preferably animal manure. This invention involves the manipulation of conditions such as temperature, pressure, solvent content, and the content and percentage of the water/alcohol solution. These conditions may be changed or optimized by one skilled in the art with little experimentation.

In the preferred embodiment of the present invention, 1 part by weight of the waste is mixed with 1.5 parts by weight of a solvent which is preferably diesel fuel and between 0.11 to 1.86 parts by weight a water/alcohol solution with a preferred water/alcohol solution of 1 part per weight. The water/alcohol solution is between 5% to 85% alcohol with 25% being the preferred amount of alcohol. The alcohol is added to the water to increase the solubility of the waste in the diesel fuel. Many alcohols could potentially work, but the preferred alcohol of use is propyl alcohol. The addition of an alkali base such as sodium hydroxide before the reaction will further increase the solubility.

The reactants are mixed into a fluid solution and loaded into a reactor, preferably closed, for heating. The mixture is then heated to a sufficient temperature, for a sufficient time, and at a sufficient pressure to create a fuel comprised of various phases followed by either active or passive cooling of the multi-phase fuel and removal of a gas by-product. The preferred embodiment of the invention utilizes a temperature of between 245° C. to 385° C. with the preferred temperature at 360° C. for the desired time period, generally about 5 to 70 minutes. The reactor will be cooled to room temperature by either active or passive cooling techniques known in the art and the gas contents will be removed from the fuel products. In a closed reactor, the pressure will be between 2250 psig and 3750 psig during the heating period. After the release of the gas, the fuel products may be analyzed. C, H, N, S may be analyzed by any suitable means known to those skilled in the art, and the elemental composition of the inorganic fraction may be analyzed by means well known to those skilled in the art, such as spectroscopy, for example.

After the multi-phase fuel has been cooled and the gas released, the remaining products may all be used as fuels. There is a solvent phase which is liquid, a separate liquid water/alcohol solution phase which is named in this application as the aqueous phase, and a solid phase. The liquid solvent phase, the aqueous phase or both may be separated from the rest of the fuels or each other by standard separation techniques such as distillation, reverse osmosis, or any other techniques known to one skilled within the art. The liquid solvent phase should not have any ash. There may be some ash by-product in the aqueous phase. The aqueous phase may have any ash by-product removed by standard separation techniques such as filtration, centrifugation, or any other technique known to one skilled within the art. The solid phase may be separated from the other phases by standard separation techniques such as filtration, centrifugation, or any other means conventional within the art. After removal from the other products, the solid phase may be dried. The solid product could also be separately blended with a surfactant and emulsified in the solvent. The solid phase may also include some ash by-product, if desired, by centrifugation and then the solid phase may be removed from the other phases to remove all ash.

The present invention discloses a method that possibly creates four different fuels. The dried solids products of the reaction have a heat of combustion of nearly 14,000 BTU/lb. The emulsified solids in the liquid phase are 70% diesel fuel, 20% converted waste solids and 5% lecithin with a heat of combustion of 18,400 BTU/lb if the solids are emulsified within the diesel fuel. Otherwise the waste is dissolved in the liquid solvent phase after the reaction and has a heat of combustion of 18,750 BTU/lb. The aqueous phase has a heat of combustion of 1,000 BTU/lb., but one skilled in the art would know to distill the water from the product where it is believed the product would have a value of about 12,500 BTU/lb. The heat of combustion for diesel fuel is 19,000 BTU/lb.

There are few byproducts from the reaction. The ash component of the feedstock does not react and would be available as a biohazard-free fertilizer. The high-density fuel is low in sulfur and nitrogen. This makes a clean-burning fuel. The sulfur and nitrogen in the feedstock probably are reduced to sulfides and ammonia, respectively, and released in the gas phase. The sulfides could be burned as fuel for the reactor or generator and the gases scrubbed with water to trap the sulfur as sulfates. The sulfates could be used to trap ammonia. The ammonium sulfate could be used as a fertilizer. The components of the gas phase could be removed by any conventional means within the art.

It will be appreciated that the present invention has provided methods for converting animal waste, such as animal manure, into usable fuels in an efficient, economical manner. The addition of a solvent such as diesel fuel to before the reaction removes the ash from the fuel products, and the addition of the water/alcohol solution increases the solubility of the waste in the reaction. Additionally, all products of the reaction, other than the gas product, have heats of combustion which would allow them to be used as a fuel.

Whereas particular embodiments have been described herein for purposes of illustration, it will be evident to those skilled in the art that numerous variations of the details may be made without departing from the invention as defined in the appended claims.

What is claimed is:

1. A fuel reactant mixture comprising about 1 part by weight animal waste, about 1.5 parts by weight petroleum based solvent and between about 0.11 to about 1.86 parts by weight a water/alcohol solution, wherein said water/alcohol solution is between about 5% to about 85% alcohol.

2. The fuel reactant mixture of claim 1 wherein said animal waste is selected from one or more of the group consisting of manure, mortalities, municipal waste, and chicken litter.

3. The fuel reactant mixture of claim 1 wherein said petroleum based solvent is diesel.

4. The fuel reactant mixture of claim 1 further comprising an alkali base.

5. The fuel reactant mixture of claim 4, wherein said alkali base is sodium hydroxide.

6. The fuel reactant mixture of claim 1 wherein said alcohol is normal propyl alcohol.

7. The fuel reactant mixture of claim 1 wherein said water/alcohol solution is about 25% alcohol.

8. The fuel reactant mixture of claim 1 wherein said water/alcohol solution is about 1 part per weight.

9. The fuel reactant mixture of claim 1 wherein said animal waste, said petroleum based solvent, and said water/alcohol solution is a fluid solution.

10. The fuel reactant mixture of claim 1, wherein said multi-phase fuel is further comprised of an aqueous phase fuel, a liquid solvent phase fuel, a solid fuel, and a gas.

* * * * *